US011403495B2

(12) United States Patent
Wu et al.

(10) Patent No.: US 11,403,495 B2
(45) Date of Patent: Aug. 2, 2022

(54) USING SYNTHETIC DATA SETS TO TRAIN A NEURAL NETWORK FOR THREE-DIMENSIONAL SEISMIC FAULT SEGMENTATION

(71) Applicant: Board of Regents, The University of Texas System, Austin, TX (US)

(72) Inventors: Xinming Wu, Hefei (CN); Yunzhi Shi, Austin, TX (US); Sergey Fomel, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 80 days.

(21) Appl. No.: 17/104,334

(22) Filed: Nov. 25, 2020

(65) Prior Publication Data

US 2021/0158104 A1    May 27, 2021

Related U.S. Application Data

(60) Provisional application No. 62/940,643, filed on Nov. 26, 2019.

(51) Int. Cl.
  *G06K 9/62*   (2022.01)
  *G06N 3/04*   (2006.01)
  *G06N 3/08*   (2006.01)

(52) U.S. Cl.
  CPC ......... *G06K 9/6262* (2013.01); *G06K 9/6256* (2013.01); *G06N 3/04* (2013.01); *G06N 3/08* (2013.01)

(58) Field of Classification Search
  CPC ............... G06K 9/6262; G06K 9/6256; G06K 9/00536; G06K 9/6271; G06N 3/04; G06N 3/08; G06N 3/0454; G06V 10/82

USPC ........................................................ 382/156
  See application file for complete search history.

(56) References Cited

U.S. PATENT DOCUMENTS

| 6,018,498 | A | 1/2000 | Neff et al. | |
|---|---|---|---|---|
| 6,151,555 | A | 11/2000 | Van Bemmel et al. | |
| 2019/0064378 | A1* | 2/2019 | Liu | G06N 3/08 |
| 2019/0064389 | A1* | 2/2019 | Denli | G06N 3/04 |

(Continued)

OTHER PUBLICATIONS

Wu, "Methods to enhance seismic faults and construct fault surfaces" Aug. 2017 (Year: 2017).*
A. A. Aqrawi et al., "Improved fault segmentation using a dip guided and modified 3D Sobel filter," SEG San Antonio 2011 Annual Meeting, Expanded Abstracts, pp. 999-1003, Sep. 18-23, 2011.

(Continued)

*Primary Examiner* — Juan A Torres
(74) *Attorney, Agent, or Firm* — Meunier Carlin & Curfman LLC

(57) ABSTRACT

A machine learning system efficiently detects faults from three-dimensional ("3D") seismic images, in which the fault detection is considered as a binary segmentation problem. Because the distribution of fault and nonfault samples is heavily biased, embodiments of the present disclosure use a balanced loss function to optimize model parameters. Embodiments of the present disclosure train a machine learning system by using a selected number of pairs of 3D synthetic seismic and fault volumes, which may be automatically generated by randomly adding folding, faulting, and noise in the volumes. Although trained by using only synthetic data sets, the machine learning system can accurately detect faults from 3D field seismic volumes that are acquired at totally different surveys.

20 Claims, 11 Drawing Sheets
(8 of 11 Drawing Sheet(s) Filed in Color)

(56) References Cited

U.S. PATENT DOCUMENTS

| | | | | |
|---|---|---|---|---|
| 2019/0383965 | A1* | 12/2019 | Salman | G01V 1/30 |
| 2020/0096660 | A1* | 3/2020 | Eckersley | G01V 1/28 |
| 2020/0183035 | A1* | 6/2020 | Liu | G01V 1/303 |
| 2020/0284936 | A1* | 9/2020 | da Silva Ferreira ... | G01V 1/345 |
| 2021/0063594 | A1* | 3/2021 | Wang | G06N 3/084 |

OTHER PUBLICATIONS

V. Badrinarayanan et al., "SegNet: A Deep Convolutional Encoder-Decoder Architecture for Image Segmentation," IEEE Transactions on Pattern Analysis and Machine Intelligence, vol. 39, No. 12, pp. 2481-2495, Jan. 1, 2017.

P. Bakker, "Image structure analysis for seismic interpretation," Ph.D. Thesis, Delft University of Technology, 128 pages, 2002.

N. L. Bangs et al., "Fluid accumulation along the Costa Rica subduction thrust and development of the seismogenic zone," J. Geophys. Res. Solid Earth, 120, pp. 67-86, Jan. 29, 2015.

T. D. Carruthers, "Interaction of Polygonal Fault Systems with Salt Diapirs," Ph.D. Thesis, Cardiff University, 525 pages, Jul. 2012.

F. Chollet, 2015, Keras, https://github.com/fchollet/keras, accessed Sep. 2018.

I. Cohen et al., "Detection and extraction of fault surfaces in 3D seismic data," Geophysics, vol. 71, No. 4, pp. P21-P27, Jul. 12, 2006.

H. Di et al., "Patch-level MLP classification for improved fault detection," SEG International Exposition and 88th Annual Meeting, Expanded Abstracts, pp. 2211-2215, Oct. 14, 19, 2018.

A. Gersztenkorn et al., "Eigenstructure-based coherence computations as an aid to 3-D structural and stratigraphic mapping," Geophysics, vol. 64, No. 5, pp. 1468-1479, Sep.-Oct. 1999.

R. Girshick et al., "Rich feature hierarchies for accurate object detection and semantic segmentation," Proceedings of the 2014 IEEE Conference on Computer Vision and Pattern Recognition, pp. 580-587, Jun. 23-28, 2014.

A. Guitton, "3D convolutional neural networks for fault interpretation," 80th EAGE Conference & Exhibition 2018, Extended Abstracts, 5 pages, Jun. 11-14, 2018.

B. Guo et al., "A new method for automatic seismic fault detection using convolutional neural network," SEG International Exposition and 88th Annual Meeting, Expanded Abstracts, pp. 1951-1955, Oct. 14-19, 2018.

D. Hale, "Structure-oriented smoothing and semblance," CWP Report 635, Colorado School of Mines, 261-270, 2009.

D. Hale, "Methods to compute fault images, extract fault surfaces, and estimate fault throws from 3D seismic images," Geophysics, vol. 78, No. 2, pp. O33-O43, Feb. 25, 2013.

K. He et al., "Mask R-CNN," Proceedings of the IEEE International Conference on Computer Vision, pp. 2961-2969, Mar. 20, 2017.

L. Huang et al., "A scalable deep learning platform for identifying geologic features from seismic attributes," The Leading Edge, vol. 36, issue 3, pp. 249-256, Mar. 2017.

D. P. Kingma et al., "Adam: A method for stochastic optimization," Published as a conference paper at the 3rd International Conference for Learning Representations, pp. 1-15, Dec. 22, 2014.

F. Li et al., "Coherence attribute at different spectral scales," Interpretation, vol. 2, No. 1, pp. 1-8, Feb. 2014.

C. Mansfield et al., "High resolution fault displacement mapping from three-dimensional seismic data: Evidence for dip linkage during fault growth," Journal of Structural Geology, vol. 18, Nos. 2/3, pp. 249-263, Feb.-Mar. 1996.

K. J. Marfurt et al., "3-D seismic attributes using a semblance-based coherency algorithm," Geophysics, vol. 63, No. 4, pp. 1150-1165, Jul.-Aug. 1998.

K. J. Marfurt et al., "Coherency calculations in the presence of structural dip," Geophysics, vol. 64, No. 1, pp. 104-111, Jan.-Feb. 1999.

D. R. Martin et al., "Learning to detect natural image boundaries using local brightness, color, and texture cues," IEEE Transactions on Pattern Analysis and Machine Intelligence, vol. 26, No. 5, pp. 530-549, May 2004.

H. Muraoka et al., "Displacement distribution along minor fault traces," Journal of Structural Geology, vol. 5, No. 5, pp. 483-495, Apr. 1983.

S. I. Pedersen et al., "New paradigm of fault interpretation," 73rd Annual International Meeting, SEG Technical Program, Expanded Abstracts, 4 pages, Jan. 2003.

F. J. Provost et al., "The case against accuracy estimation for comparing induction algorithms," Proceedings of the 15th International Conference on Machine Learning, 9 pages, 1998.

T. Randen et al., "Automatic extraction of fault surfaces from three-dimensional seismic data," 81st Annual International Meeting, SEG Technical Program, Expanded Abstracts, 5 pages, Jan. 1999.

S. Ren et al., "Faster R-CNN: Towards Real-Time Object Detection with Region Proposal Networks," Advances in Neural Information Processing Systems, 9 pages, 2015.

O. Ronneberger et al., "U-Net: Convolutional networks for biomedical image segmentation," International Conference on Medical Image Computing and Computer-Assisted Intervention, 234-241, 2015.

M. G. Rowan et al., "Salt-related fault families and fault welds in the Northern Gulf of Mexico," AAPG Bulletin, vol. 83, No. 9, 1454-1484, 1999.

S. A. Stewart, "Displacement distributions on extensional faults: Implications for fault stretch, linkage, and seal," AAPG Bulletin, vol. 85, No. 4, pp. 587-599, Apr. 2001.

X. Wu, 2017, Directional structure-tensor based coherence to detect seismic faults and channels,"Geophysics, 82, No. 2, A13-A17, doi," 10.1190/ geo2016-0473.1.

X. Wu, 2018a, Kerry-3D, https://wiki.seg.org/wiki/Kerry-3D, accessed Mar. 2019.

X. Wu, 2018b, Opunake-3D, https://wiki.seg.org/wiki/Opunake-3D, accessed Mar. 2019.

X. Wu, 2019, GitHub repository, https://github.com/xinwucwp/faultSeg, accessed Mar. 2019.

X. Wu and S. Fomel, 2018, Automatic fault interpretation with optimal surface voting, Geophysics, 83, No. 5, O67-O82, doi: 10.1190/ geo2018-0115.1.

X. Wu and D. Hale, "3D seismic image processing for faults," Geophysics, vol. 81, No. 2, pp. IM1-IM11, Mar.-Apr. 2016.

X. Wu, Y. Shi, S. Fomel, and L. Liang, 2018, "Convolutional neural networks for fault interpretation in seismic images," SEG International Exposition and 88th Annual Meeting, Expanded Abstracts, 1946-1950, Oct. 14-19, 2018.

X. Wu and Z. Zhu, 2017, "Methods to enhance seismic faults and construct fault surfaces," Computers and Geosciences, 107, 37-48, doi: 10.1016/j.cageo.2017.06.015.

X. Wu, et al. "FaultSeg3D: Using synthetic data sets to train an end-to-end convolutional neural network for 3D seismic fault segmentation." Geophysics 84.3 (2019): IM35-IM45.

X. Wu, and Dave Hale. "Automatically interpreting all faults, unconformities, and horizons from 3D seismic images." Interpretation 4.2 (2016): T227-T237.

S. Xie and Z. Tu, 2015, "Holistically-nested edge detection," Proceedings of the IEEE International Conference on Computer Vision, pp. 1395-1403.

T. Zhao et al., "A fault-detection workflow using deep learning and image processing," SEG International Exposition and 88th Annual Meeting, Expanded Abstracts, pp. 1966-1970, Oct. 14-19, 2018.

* cited by examiner

USING SYNTHETIC DATA SETS TO TRAIN A NEURAL NETWORK FOR THREE-DIMENSIONAL SEISMIC FAULT SEGMENTATION

CROSS REFERENCE TO RELATED APPLICATION

This application claims priority to and benefit of U.S. provisional patent application Ser. No. 62/940,643 filed Nov. 26, 2019, which is fully incorporated by reference and made a part hereof.

TECHNOLOGY FIELD

The present disclosure relates in general to the analysis of seismic data, and in particular, to detection of faults from seismic images.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Delineating faults from seismic images is a key step for seismic structural interpretation, reservoir characterization, and well placement. In conventional methods, faults are considered as seismic reflection discontinuities and are detected by calculating attributes that estimate reflection continuities or discontinuities.

Faults are typically recognized as lateral reflection discontinuities in a three-dimensional ("3D") seismic image. Based on this observation, numerous methods have been proposed to detect faults by calculating attributes of measuring seismic reflection continuity such as semblance (Marfurt et al., 1998) and coherency (Marfurt et al., 1999; Li and Lu, 2014; Wu, 2017), or reflection discontinuity such as variance (U.S. Pat. No. 6,151,555; Randen et al., 1999) and gradient magnitude (Aqrawi et al., 2011). These seismic attributes, however, can be sensitive to noise and stratigraphic features, which also correspond to reflection discontinuities in a seismic image. This means that measuring seismic reflection continuity or discontinuity alone is insufficient to detect faults (Hale, 2013).

Faults are typically more vertically aligned, whereas stratigraphic features mostly extend laterally. Based on this observation, Gersztenkorn et al. (1999) suggest using vertically elongated windows in computing seismic coherence to enhance faults while suppressing the stratigraphic features. Similarly, some other authors (Bakker, 2002; Hale, 2009; Wu, 2017) apply smoothing in directions perpendicular to seismic reflections in computing coherence or semblance by assuming that faults are typically normal to reflections. However, faults are seldom vertical or are not necessarily perpendicular to seismic reflections. Therefore, some authors (Hale, 2013; Wu and Hale, 2016) propose smoothing the numerator and denominator of the semblance along fault strikes and dips to compute the fault-oriented semblance or fault likelihood. However, calculating fault-oriented semblance is computationally more expensive than the previous attributes because it requires scanning over all possible combinations of fault strikes and dips to find the maximum fault likelihoods.

Some fault detection methods start with some initial fault attributes and further enhance them by smoothing the attributes along fault strikes and dips (U.S. Pat. No. 6,018,498; Cohen et al., 2006; Wu and Zhu, 2017). These methods also need to smooth the fault attributes over all possible combinations of fault strikes and dips to obtain the best enhanced fault features. Similarly, some authors (Pedersen et al., 2002, 2003) propose to enhance fault features along paths of "artificial ants" by assuming that the paths follow faults. Wu and Fomel (2018) propose an efficient method to extract optimal surfaces following maximum fault attributes and use these optimal surfaces to vote for enhanced fault images of fault probabilities, strikes, and dips.

Recently, some convolutional neural network ("CNN") methods have been introduced to detect faults by pixel-wise fault classification (fault or nonfault) with multiple seismic attributes (Huang et al., 2017; Di et al., 2018; Guitton, 2018; Guo et al., 2018; Zhao et al., 2018). Wu et al. (2018) use a CNN-based pixel-wise classification method to not only predict the fault probability but also estimate the fault orientations at the same time. These methods need to choose a local window or cube to make fault prediction at every image pixel, which is computationally highly expensive, especially in 3D fault detection.

SUMMARY

Delineating faults from seismic images is a key step for seismic structural interpretation, reservoir characterization, and well placement. In conventional methods, faults are considered as seismic reflection discontinuities and are detected by calculating attributes that estimate reflection continuities or discontinuities. Aspects of the present disclosure consider fault detection as a binary image segmentation problem of labeling a 3D seismic image with ones on faults and zeros elsewhere. Aspects of the present disclosure perform an efficient image-to-image fault segmentation using a machine learning system (e.g., a convolutional neural network). To train the machine learning system, aspects of the present disclosure automatically create 200 three-dimensional synthetic seismic images and corresponding binary fault labeling images, which are shown to be sufficient to train a good fault segmentation system. Because a binary fault image is highly imbalanced between zeros (nonfault) and ones (fault), aspects of the present disclosure use a class-balanced binary cross-entropy loss function to adjust the imbalance so that the machine learning system is not trained or converged to predict only zeros. After training with only the synthetic data sets, the machine learning system automatically learns to calculate rich and proper features that are important for fault detection. Multiple field examples indicated that the machine learning system (trained by only synthetic data sets) can predict faults from 3D seismic images much more accurately and efficiently than conventional methods. For example, with a TITAN Xp GPU, the training processing can take approximately two hours, and predicting faults in a 128×128×128 seismic volume can take only milliseconds.

BRIEF DESCRIPTION OF THE DRAWINGS

The accompanying drawings, which are incorporated in and constitute a part of this specification, illustrate embodiments and together with the description, serve to explain the principles of the methods and systems. The patent or application file contains at least one drawing executed in color. Copies of this patent or patent application publication with color drawing(s) will be provided by the Office upon request and payment of the necessary fee.

DETAILED DESCRIPTION

Figure 1:
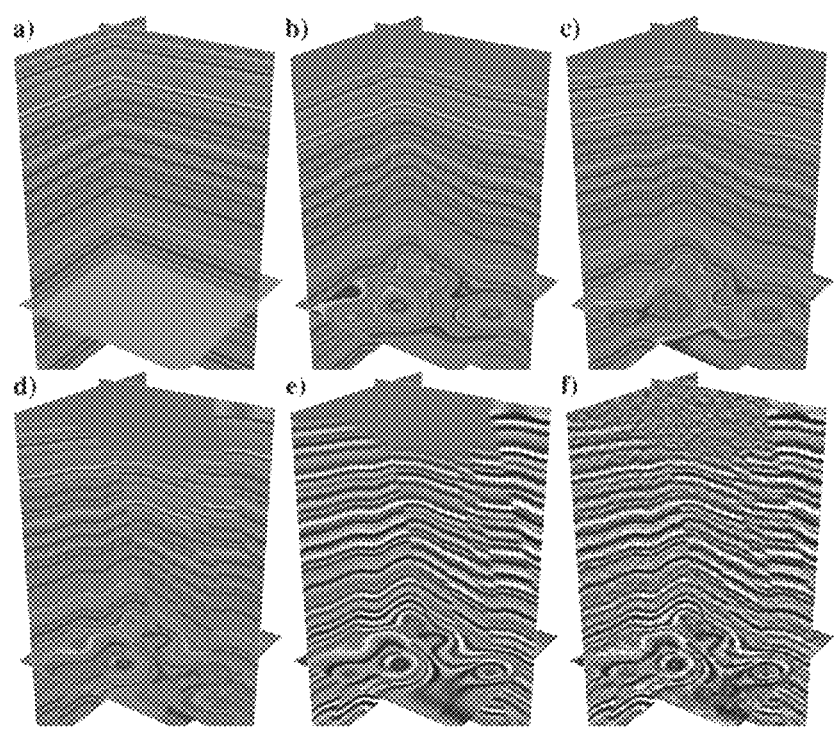
FIG. 1 shows images (a)-(f) that depict an exemplary representation of a system and process for creating 3D synthetic training data sets in accordance with embodiments of the present disclosure.

Various detailed embodiments of the present disclosure are disclosed herein. However, it is to be understood that the disclosed embodiments are merely exemplary of the disclosure, which may embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

Data and source code pertaining to embodiments of the present disclosure are available and can be accessed via the following URL: https://github.com/xinwucwp/faultSeg, all of which is hereby incorporated by reference herein.

Embodiments of the present disclosure are described herein using a convolution neural network ("CNN"). However, embodiments of the present disclosure are not limited to use with such a CNN, but may be implemented with any machine learning system, such as those disclosed herein.

Aspects of the present disclosure consider the fault detection as a more efficient end-to-end binary image segmentation problem by using CNNs. Image segmentation has been well-studied in computer science, and multiple powerful CNN architectures (e.g., Girshick et al., 2014; Ren et al., 2015; Ronneberger et al., 2015; Xie and Tu, 2015; Badrinarayanan et al., 2017; He et al., 2017) have been proposed to obtain superior segmentation results. Embodiments of the present disclosure use an efficient end-to-end CNN (e.g., one simplified from U-Net (Ronneberger et al., 2015)) to perform the task of 3D binary fault segmentation. Embodiments of the present disclosure may be configured to simplify an original U-Net by reducing the number of convolutional layers and features at each layer, which can significantly save graphics processing unit ("GPU") memory and computational time but still preserve high performance in the 3D fault detection tasks. Considering a fault binary image is highly biased with mostly zeros, but only very limited ones on the faults, embodiments of the present disclosure use a balanced cross-entropy loss function for optimizing the parameters of the CNN model.

To train and validate the neural network, embodiments of the present disclosure implement a process to automatically generate 3D synthetic seismic and corresponding fault images. In this process, the seismic folding and faulting structures, wavelet peak frequencies, and noise are defined by a set of parameters, and each parameter can be chosen from some predefined range. By randomly choosing a combination of these parameters within the predefined ranges, embodiments of the present disclosure are able to generate numerous unique seismic images and corresponding fault labeling images. Exemplary embodiments of the present disclosure train and validate, respectively, by using 200 and 20 pairs of synthetic seismic and fault images, which turned out to be sufficient to train a good CNN model for performance of fault detection tasks in accordance with embodiments of the present disclosure. However, embodiments of the present disclosure are not to be limited to utilization of exactly 200 and 20 pairs of synthetic seismic and fault images.

Although trained by using only synthetic seismic data sets, the CNN model configured in accordance with embodiments of the present disclosure can work much better and more efficiently than conventional methods for 3D fault detection in field seismic data sets that are recorded at totally different surveys. In a non-limiting example, by using a TITAN Xp GUP, the CNN model configured in accordance with embodiments of the present disclosure requires less than five minutes to predict faults in a large seismic volume with 450×1950×1200 samples.

Training Data Sets

Training and validating a CNN model often requires a large amount of images and corresponding labels. Manually labeling or interpreting faults in a 3D seismic image could be extremely time consuming and highly subjective. In addition, inaccurate manual interpretation, including mislabeled and unlabeled faults, may mislead the learning process. To avoid these problems, embodiments of the present disclosure implement an effective and efficient technique to create synthetic seismic images and corresponding fault labels for training and validating the CNN model.

Synthetic Seismic and Fault Images

Figure 12:
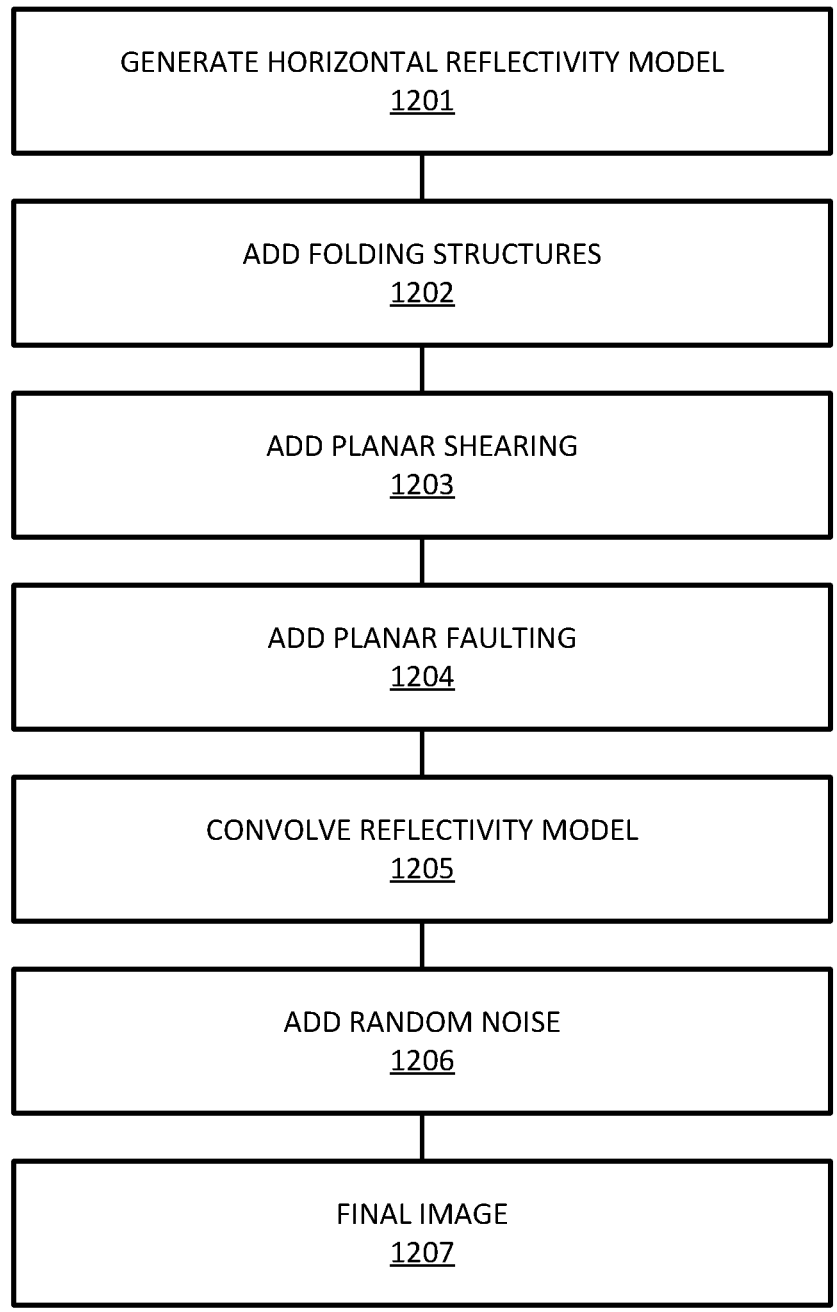
FIG. 12 illustrates a flowchart diagram configured in accordance with embodiments of the present disclosure.

Referring to FIGS. 1 and 12, there is depicted a system and process 1200 for creating synthetic seismic and fault images. In process block 1201, a 1D horizontal reflectivity model r(x,y,z) (see image (a) of FIG. 1) with a sequence of random numbers/values that are in the range of [−1, 1]. In process block 1202, some folding structures are created/added in the reflectivity model by vertically shearing the model, wherein the shearing shifts may be defined by a combination of several 2D Gaussian functions. For example, the folding structures may be defined by using the following function (Equation (1)):

$$s_1(x, y, z) = a_0 + \frac{1.5z}{z_{max}} \sum_{k=1}^{k=N} b_k e^{-\frac{(x-c_k)^2+(y-d_k)^2}{2\sigma_k^2}}, \quad (1)$$

which combines with multiple 2D Gaussian functions and a linear-scale function $1.5z/z_{max}$. The combination of 2D Gaussian functions yields laterally varying folding structures, whereas the linear-scale function damps the folding vertically from below to above. In Equation (1), each combination of the parameters $a_0$, $b_k$, $c_k$, $d_k$, and $\sigma_k$ yields some specific spatially varying folding structures in the model. By randomly choosing each of the parameters from the predefined ranges, embodiments of the present disclosure are able to create numerous models with unique structures. With the shift map $s_1(x,y,z)$, embodiments of the present disclosure may use a sinc interpolation to vertically shift the original reflectivity model r(x,y,z) to obtain a folded model $r(x,y,z+s_1(x,y,z))$ as shown in image (b) of FIG. 1.

In process block 1203, to further increase the complexity of the structures in the model, embodiments of the present disclosure may also add some planar shearing to the model to increase the complexity of the folding structures. Such planar shearing may be defined by Equation (2) as follows:

$$s_2(x,y,z)=e_0+fx+gy \quad (2)$$

where the shearing shifts are laterally planar while being vertically invariant. The parameters $e_0$, f and g, again, may be randomly chosen from some predefined ranges. By sequentially applying the planar shifts $s_2(x,y,z)$ to the previously folded model $r(x,y,z+s_1(x,y,z))$, embodiments of the present disclosure obtain a new reflectivity model $r(x,y,z+s_1+s_2)$ as shown in image (c) of FIG. 1.

Referring to process block 1204, after obtaining a folded reflectivity model, embodiments of the present disclosure may then add planar faulting to the model to obtain a folded and faulted reflectivity model as shown in image (d) of FIG. 1. Although all the faults are planar, the fault orientations (dip and strike) and displacements of the faults are all different from each other. The fault displacements on each fault may be allowed to be spatially varying along the directions of fault strike and dip. The common patterns of fault displacement distribution have been discussed by some authors (Muraoka and Kamata, 1983; Mansfield and Cartwright, 1996; Stewart, 2001). In generating faults in synthetic models, embodiments of the present disclosure may define the fault displacement distributions as a Gaussian function or linear function. In the case of Gaussian distribution, the fault displacements decrease from the fault center in all directions along the fault plane. In the other case of linear distribution, the fault displacements linearly increase (normal fault) or decrease (reverse fault) in the fault dip direction along the fault plane. The maximum fault displacement for each fault may be randomly chosen in a range between about 0 and 40 samples. It has been observed that images with more faults are more effective than those with fewer faults to train a CNN for fault segmentation. Therefore, embodiments of the present disclosure may add more than five faults within a training image with the size of 128×128×128. However, these faults should not be too close to each other as shown in image (d) of FIG. 1, in which six planar faults have been added.

Referring to process block 1205, after creating a folded and faulted reflectivity model as shown in image (d) of FIG. 1, embodiments of the present disclosure convolve this model (e.g, with a Ricker wavelet) to obtain a 3D seismic image as shown in image (e) of FIG. 1. The peak frequency of the wavelet may be also randomly chosen from a predefined range. Note that embodiments of the present disclosure may convolve the reflectivity model with a wavelet after (not before) creating the folding and faulting in the model because the convolution will blur the sharp discontinuities near faults, and therefore make the faults look more realistic.

Figure 2:
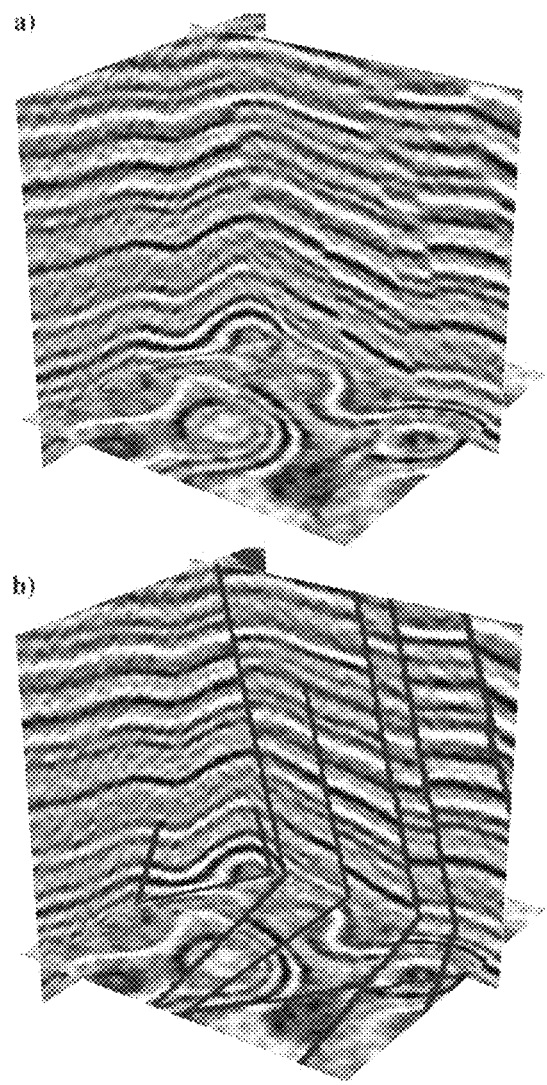
FIG. 2 shows a final synthetic seismic image (a) cropped from the larger image (f) in FIG. 1, and a corresponding true fault image (b) overlaid with the cropped seismic image.

Referring to process block 1206, to further improve the realism of the synthetic seismic image, embodiments of the present disclosure may optionally also add some random noise to the image as shown in image (f) of FIG. 1. Referring to process block 1207, from this noisy image, embodiments of the present disclosure may crop a final training seismic image (see image (a) of FIG. 2) with a size of 128 ×128×128 to avoid artifacts near the boundaries. Image (b) of FIG. 2 shows the corresponding binary fault labeling image, in which the faults are labeled by ones at two pixels adjacent to the faults from the hanging wall and footwall sides.

By using the system and process 1200, embodiments of the present disclosure randomly choose parameters of folding, faulting, wavelet peak frequency, and noise to obtain about 200 pairs of 3D unique seismic images and corresponding fault labeling images. Embodiments of the present disclosure can actually generate many more unique training data sets, but applicants have discovered that about 200 pairs of images are sufficient to train a pretty good neural network for fault segmentation. Using the same system and process 1200, embodiments of the present disclosure also automatically generated about 20 pairs of seismic and fault labeling images for the validation.

Data Augmentation

Creating unique training seismic and fault labeling images, as discussed above, is important to successfully train a fault segmentation neural network. Data augmentation during the training is also helpful to increase the diversity of the data sets and to prevent the neural network from learning irrelevant patterns. Embodiments of the present disclosure may apply simple data augmentations including vertical flip and rotation around the vertical time or depth axis. To avoid interpolation and artifacts near boundaries, embodiments of the present disclosure may rotate the seismic and fault labeling volumes by only three options of 90°, 180°, and 270°. In exemplary embodiments where the input seismic and fault labeling volumes are 128×128×128 cubes, the flip and rotation will preserve the image size without needing interpolation or extrapolation. Note that, in accordance with certain embodiments of the present disclosure, the seismic and fault volumes may not be rotated around the inline or crossline axis because it will yield vertical seismic structures and flat faults, which are geologically unrealistic.

Fault Segmentation by CNN

Aspects of the present disclosure consider 3D fault detection as an image segmentation problem of labeling ones on faults, whereas zeros are elsewhere in a 3D seismic image. In accordance with embodiments of the present disclosure, such fault segmentation can be achieved by using a simplified version of U-Net, an end-to-end fully CNN. In 3D seismic images, the distribution of fault samples and non-fault samples is typically highly imbalanced; therefore, embodiments of the present disclosure may use a balanced binary cross-entropy loss to optimize the parameters of the network as discussed by Xie and Tu (2015).

CNN Architecture

Applicants began research on fault segmentation by using the original U-Net architecture (Ronneberger et al., 2015), which turned out to be more complicated than necessary for the problem of fault detection. Applicants reduced the convolutional layers and features at each layer to save memory and computation but still preserve good performance in fault detection.

Figure 3:
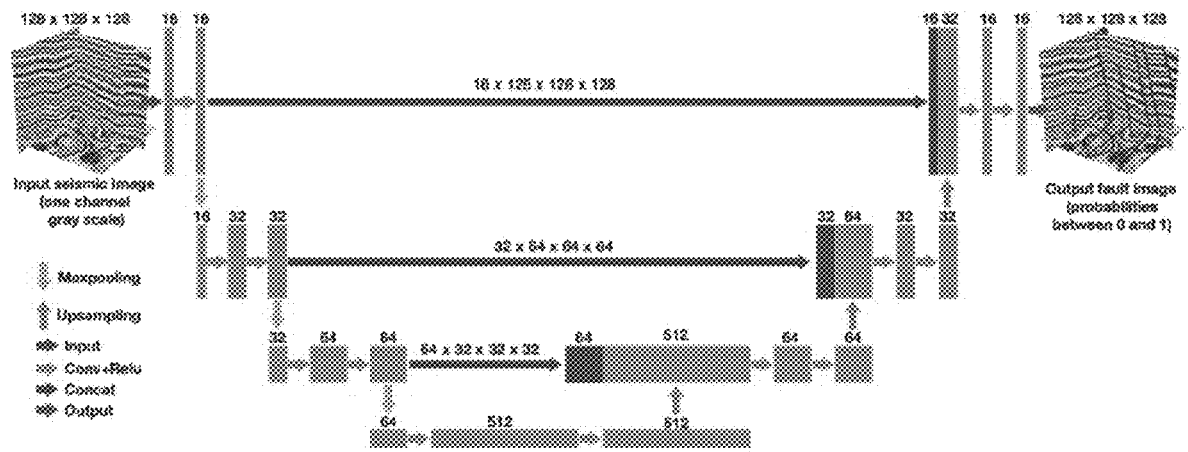
FIG. 3 illustrates a simplified schematic diagram of implementation of a machine learning system (e.g., an end-to-end convolutional neural network) utilized for 3D fault detection in accordance with embodiments of the present disclosure.

A simplified U-Net that embodiments of the present disclosure use for 3D fault detection is illustrated in the schematic diagram of FIG. 3, in which an input 3D seismic image is fed to a network that contains a contracting path (left side) and an expansive path (right side) as in the original U-Net architecture. In the left contracting path, each step contains two 3×3×3 convolutional layers followed by a ReLU activation and a 2×2×2 max pooling operation with stride 2 for downsampling. The number of features may be doubled after each step in accordance with embodiments of the present disclosure. Steps in the right expansion path contain a 2×2×2 upsampling operation, a concatenation with features from the left contracting path, and two 3×3×3 convolutional layers followed by a ReLU activation. Different from the original U-Net architecture, embodiments of the present disclosure may not include a 2×2×2 "up-convolution" layer after each upsampling as in the original expansion path. The upsampling operation may be implemented by using the function UpSampling3D defined in Keras (Chollet, 2015). The final output layer may be a 1×1×1 convolutional layer with a sigmoid activation to map each 16C feature vector to a probability value in the output fault probability map, which has the same size as the input seismic image. This simplified U-Net architecture includes 15 convolutional layers, reduced from 23 convolutional layers in the original U-Net architecture. The number of features at these convolutional layers is also significantly reduced from the original architecture.

Balanced Cross-Entropy Loss

The following binary cross-entropy loss function (Equation (3)) is widely used in the binary segmentation of a common image:

$$\mathbb{L} = -\sum_{i=0}^{i=N} y_i \log(p_i) \qquad (3)$$
$$-\sum_{i=0}^{i=N} (1-y_i)\log(1-p_i),$$

where N denotes the number of pixels in the input 3D seismic image. The term $y_i$ represents the true binary labels and $p_i$ represents the prediction probabilities ($0<p_i<1$) computed from the sigmoid activation in the last convolutional layer. Because the true labels $y_i$ are binary values (0 or 1), the first term measures the prediction errors at the image pixels labeled by ones, whereas the second term measures the prediction errors at the pixels labeled by zeros.

This loss function works well for binary segmentation of common images in which the distribution of zero/nonzero samples is more or less balanced. This loss function, however, is not suitable to measure the errors of fault segmentation, in which more than 90% of the samples are nonfault samples (labeled by zeros), whereas the fault samples (labeled by ones) are very limited. If the neural network were trained using this loss function, the network could easily converge to the wrong direction and make zero predictions everywhere because zero prediction is a good solution to this loss function in the fault segmentation problem.

To solve this problem, embodiments of the present disclosure use the following balanced cross-entropy loss function (Equation (4)) as discussed by Xie and Tu (2015):

$$\mathbb{L} = -\beta \sum_{i=0}^{i=N} y_i \log(p_i) - (1-\beta)\sum_{i=0}^{i=N}(1-y_i)\log(1-p_i), \qquad (4)$$

where $$\beta = \Sigma_{i=0}^{i=N}(1-y_i)/N$$

represents the ratio between nonfault pixels and the total image pixels, whereas $1-\beta$ denotes the ratio of fault pixels in the 3D seismic image.

Training and Validation

As previously disclosed with respect to FIGS. 1-2, embodiments of the present disclosure train the CNN by using about 200 pairs of synthetic 3D seismic and fault images that are automatically created. The validation data set may contain about another 20 pairs of such synthetic seismic and fault images, which are not used in the training data set. Considering the amplitude values of different real seismic images can be much different from each other, embodiments of the present disclosure normalize all the training seismic images, each image is subtracted by its mean value and divided by its standard deviation.

Figure 4:
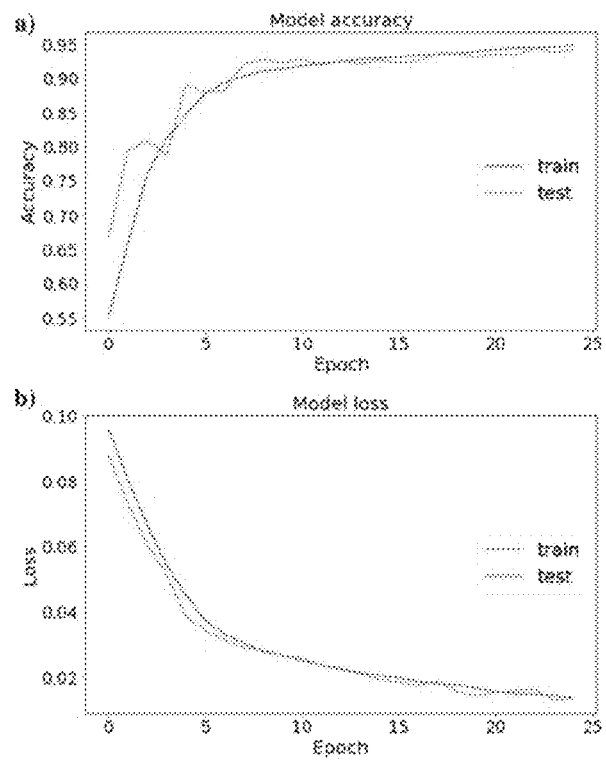
FIG. 4 illustrates plots showing (a) a training and validation accuracy increase with epochs, and (b) a training and validation loss decrease with epochs.

In accordance with embodiments of the present disclosure, the size of each 3D seismic or fault image may be set to 128×128×128. This relatively small size may be selected because the memory of a GPU to process the data may be limited (e.g., 12 GB). Larger sizes for the 3D seismic or fault images may be utilized if the GPU memory is larger. In accordance with embodiments of the present disclosure, the 3D seismic images may be fed to the neural network in batches and each batch contains four images, which include an original image and the same image rotated around the vertical time/depth axis by 90°, 180°, and 270°. Larger batch sizes may be utilized if the GPU memory is larger. In accordance with embodiments of the present disclosure, the Adam method (Kingma and Ba, 2014) may be used to optimize the network parameters and set the learning rate to be 0.0001. Embodiments of the present disclosure may train the network with about 25 epochs, wherein all the 200 training images are processed at each epoch. As shown in plot (a) of FIG. 4, the training and validation accuracies can gradually increase to 95%, whereas, as shown in plot (b) of FIG. 4, the training and validation loss can converge to 0.01 after 25 epochs.

Figure 5:
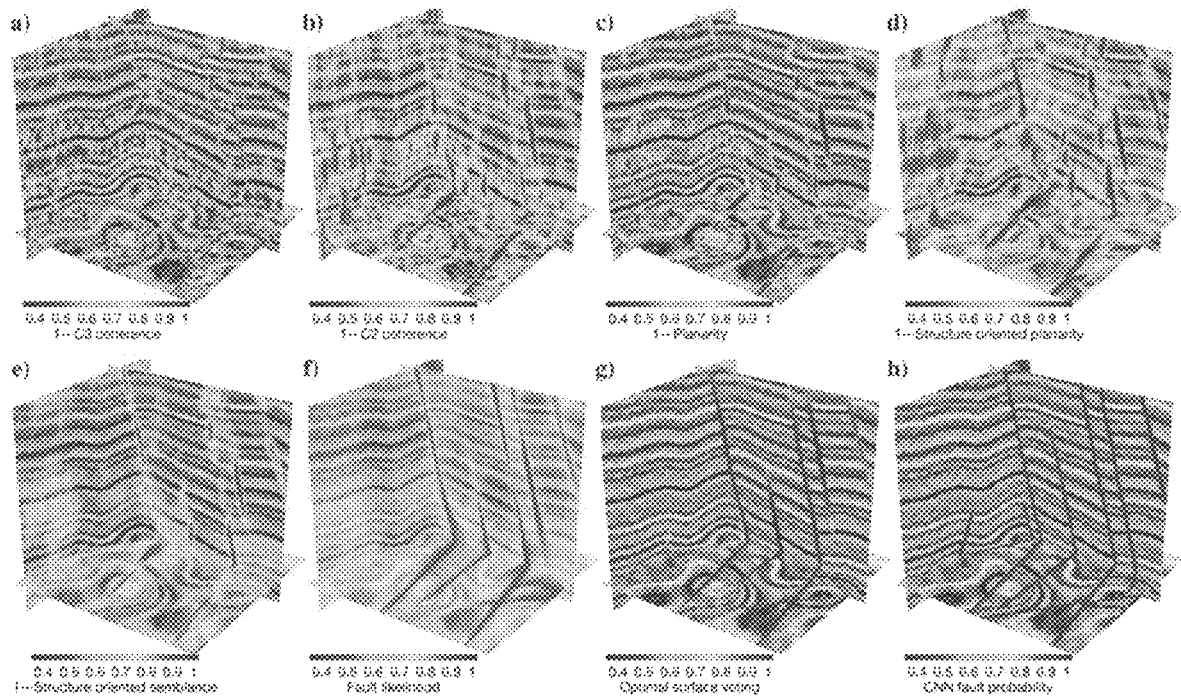
FIG. 5 shows images comparing fault detections on the synthetic validation volume pertaining to the image (a) of FIG. 2 by using seven well-known methods (images (a)-(g)), and a technique configured in accordance with embodiments of the present disclosure (image (h)).

To verify the CNN model trained with 25 epochs, embodiments of the present disclosure applied this trained model together with another seven commonly used fault detection methods to the synthetic seismic volume (see image (a) of FIG. 2), which was not included in the training data sets. The images (a)-(h) of FIG. 5 show the results of all eight fault detection methods that were, respectively, computed by using the methods of C3 (Gersztenkorn et al., 1999), C2 (Marfurt et al., 1999), planarity (Hale, 2009), structure-oriented linearity (Wu, 2017), structure-oriented semblance (Hale, 2009), fault likelihood (Hale, 2013; Wu and Hale, 2016), optimal surface voting (Wu and Fomel, 2018), and a CNN-based segmentation technique configured in accordance with embodiments of the present disclosure. The input for the optimal surface voting method is the planarity volume (see image (c) of FIG. 5), and the input for all the other methods is the amplitude volume (see image (a) of FIG. 2). Compared with the first five methods (see images (a)-(e) of FIG. 5), the fault likelihood method (see image (f) of FIG. 5) and optimal surface voting method (see image (g) of FIG. 5) provided better fault detections in which the fault features are less noisy and can be more continuously tracked. However, a CNN technique configured in accordance with embodiments of the present disclosure, and as described herein, achieved the best performance in computing an accurate, clean, and complete fault detection, which was most consistent with the true fault labeling shown in image (b) of FIG. 2.

Figure 6:
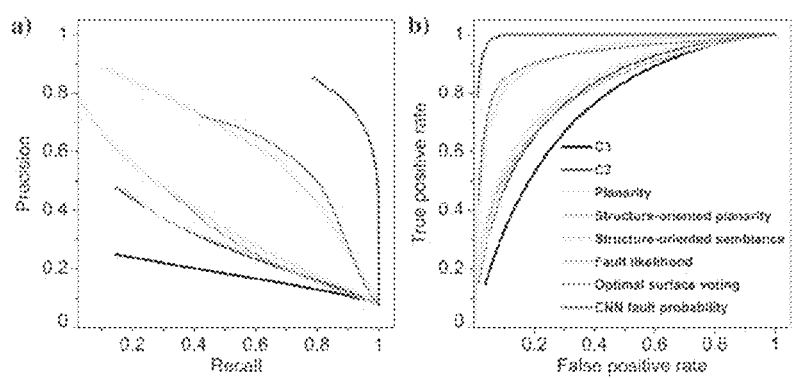
FIG. 6 illustrates plots of (a) precision-recall and (b) receiver-operating-characteristic ("ROC") curves used to evaluate the eight fault detections on the synthetic validation volume (images (a)-(h) of FIG. 5).

To quantitatively evaluate the fault detection methods, applicants further calculated the precision-recall (Martin et al., 2004) and receiver-operating-characteristic ("ROC") (Provost et al., 1998) plots shown in FIGS. 6(a) and 6(b), respectively. From the precision-recall plots in FIG. 6(a), it can clearly be observed that a CNN method configured in accordance with embodiments of the present disclosure (see the red curve in FIG. 6(a)) provided the highest precision for all choices of recall. The precisions of the fault likelihood (see the orange curve in FIG. 6(a)) and optimal surface voting (see the magenta curve in FIG. 6(a)) methods are relatively lower than the CNN method of the present disclosure, but they are higher than the other five methods. The ROC curves in FIG. 6(b) provide similar evaluations of the methods.

In the next section, embodiments of the present disclosure will use the same CNN model (trained by only synthetic data sets) to four field seismic images that are acquired at different surveys. In this highly strict precision evaluation, the fault detections are expected to perfectly match the true fault labels with the thickness of only two samples. However, all of the methods should have higher precision if each fault is considered as a thicker zone and all fault detections within the zone are good enough.

Applications

It might not be surprising that the CNN model, trained by synthetic data sets, works well to detect faults in a synthetic seismic image (see image (h) in FIG. 5) that is also created by using the same process for creating the training data sets. Applicants further tested the same CNN model on four field seismic images that were acquired at different surveys. To be consistent with the synthetic training seismic images, each of the field seismic images was subtracted by its mean value and divided by its standard deviation to obtain a consistently normalized image. The fault prediction results were compared with the thinned fault likelihood (Hale, 2013; Wu and Hale, 2016), which is a superior attribute (better than most of the conventional attributes (see FIGS. 5 and 6) for fault detection.

Figure 7:
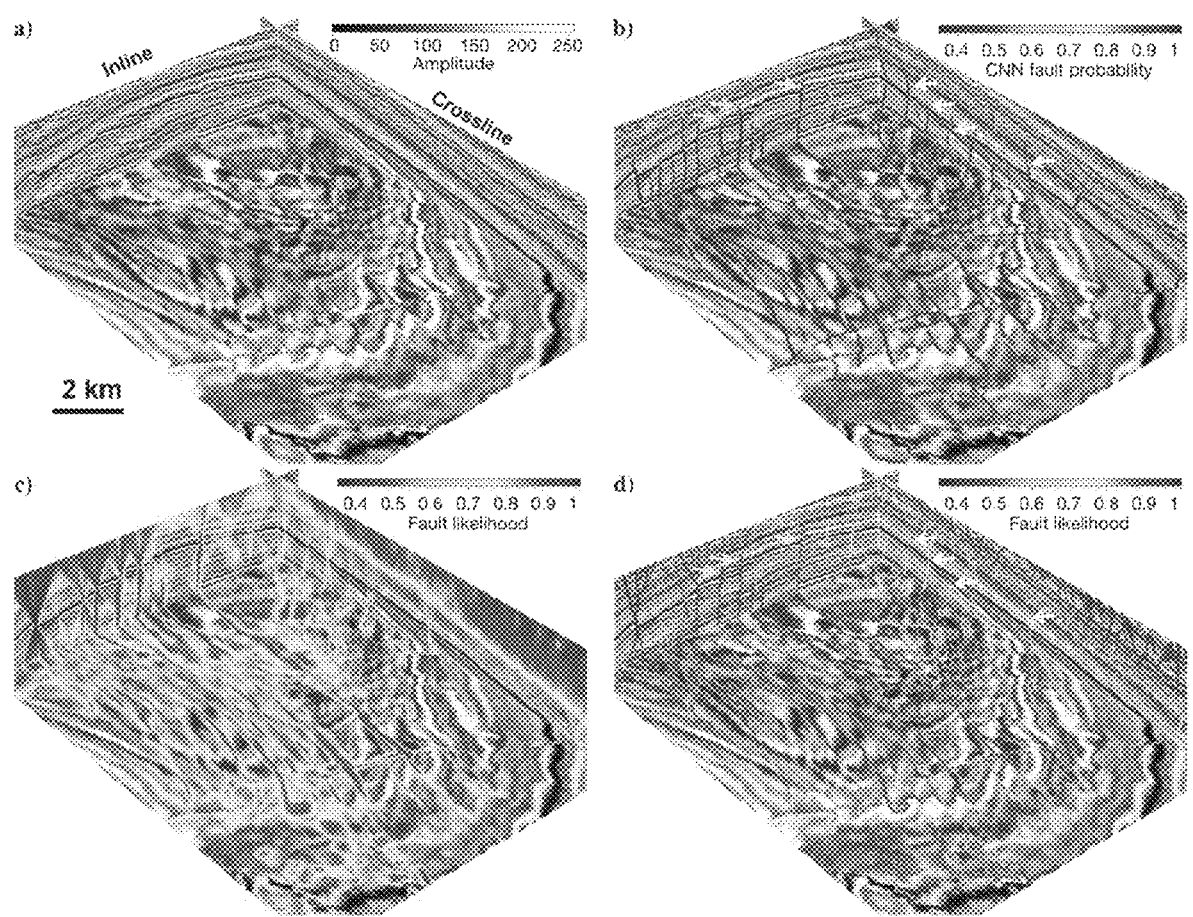
FIG. 7 shows images of a 3D seismic image (a) displayed with faults that are detected by using a trained model configured in accordance with embodiments of the present disclosure (image (b)), a fault likelihood method (image (c)), and a thinned fault likelihood method (image (d)).

The first 3D seismic volume shown in image (a) of FIG. 7 is a subset (128 [vertical]×384 [inline]×512 [crossline] samples) extracted from the Netherlands off-shore F3 block seismic data, which was provided by the Dutch government through TNO and dGB Earth Sciences. Multioriented faults are apparent within this 3D seismic volume. Image (b) of FIG. 7 shows the fault probability image predicted by using a trained CNN model configured in accordance with embodiments of the present disclosure. The color in this fault image represents the fault probability, which is computed by the sigmoid activation in the last convolutional layer. Although trained by only synthetic data sets, this CNN model works well to provide a clean and accurate prediction of faults in this field seismic image. In this CNN fault probability image, most fault features have very high probabilities (close to 1) and only very limited noisy features are observed. Although only planar faults were added in the training data sets, the networks actually learned to detect curved faults in the field seismic image as shown on the time slice in image (b) of FIG. 7. Images (c) and (d) of FIG. 7, respectively, show the fault likelihood attribute (Hale, 2013; Wu and Hale, 2016) before and after thinning. The thinned fault likelihood (image (d) of FIG. 7) works fine to highlight the faults within this seismic image. However, a lot of more noisy features are observed than in the CNN fault probability image (image (b) of FIG. 7). In addition, as denoted by the yellow arrows on the inline slice (image (d) of FIG. 7), the fault-oriented smoothing in calculating the fault likelihood actually extends the fault features beyond the top of true faults. In addition, the fault likelihood is computed from the semblance/coherence of seismic reflections, which can be sensitive to noisy reflections (see the red features on the crossline in image (d) of FIG. 7) but insensitive to the faults with small fault displacements (like those faults denoted by white arrows in image (d) of FIG. 7). However, the trained CNN model of the present disclosure is more robust to noise and can better measure the probability of faults with small displacements.

Figure 8:
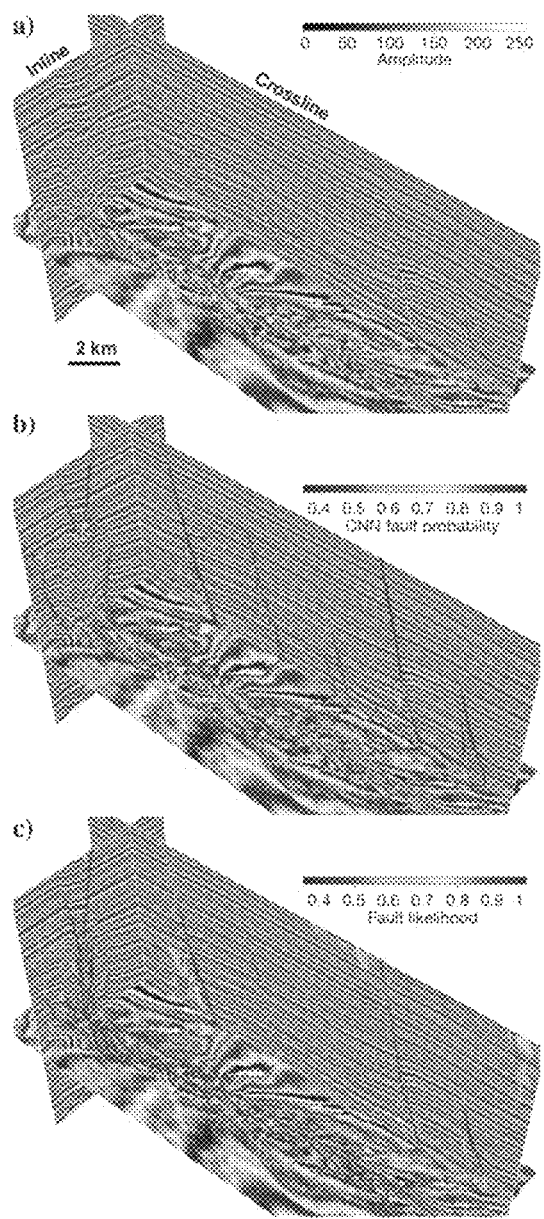
FIG. 8 shows images of (a) a 3D seismic image displayed with faults that are detected by using a trained model configured in accordance with embodiments of the present disclosure (image (b)), and a thinned fault likelihood method (image (c)).

The second 3D seismic image shown in image (a) of FIG. 8 was provided by Clyde Petroleum Plc. through Paradigm. Different from the previous synthetic and field examples, the faults in this seismic image are not apparent as sharp reflection discontinuities. Instead, the faults are imaged like reflections in this 3D seismic image as shown in image (a) of FIG. 8. However, the CNN model of the present disclosure still worked well to detect the faults shown in image (b) of FIG. 8, which means that the network wisely learned to predict faults by not detecting sharp discontinuities or edges. Image (c) of FIG. 8 shows the thinned fault likelihoods that are noisier than the CNN fault probabilities as shown on the horizontal slice.

Figure 9:
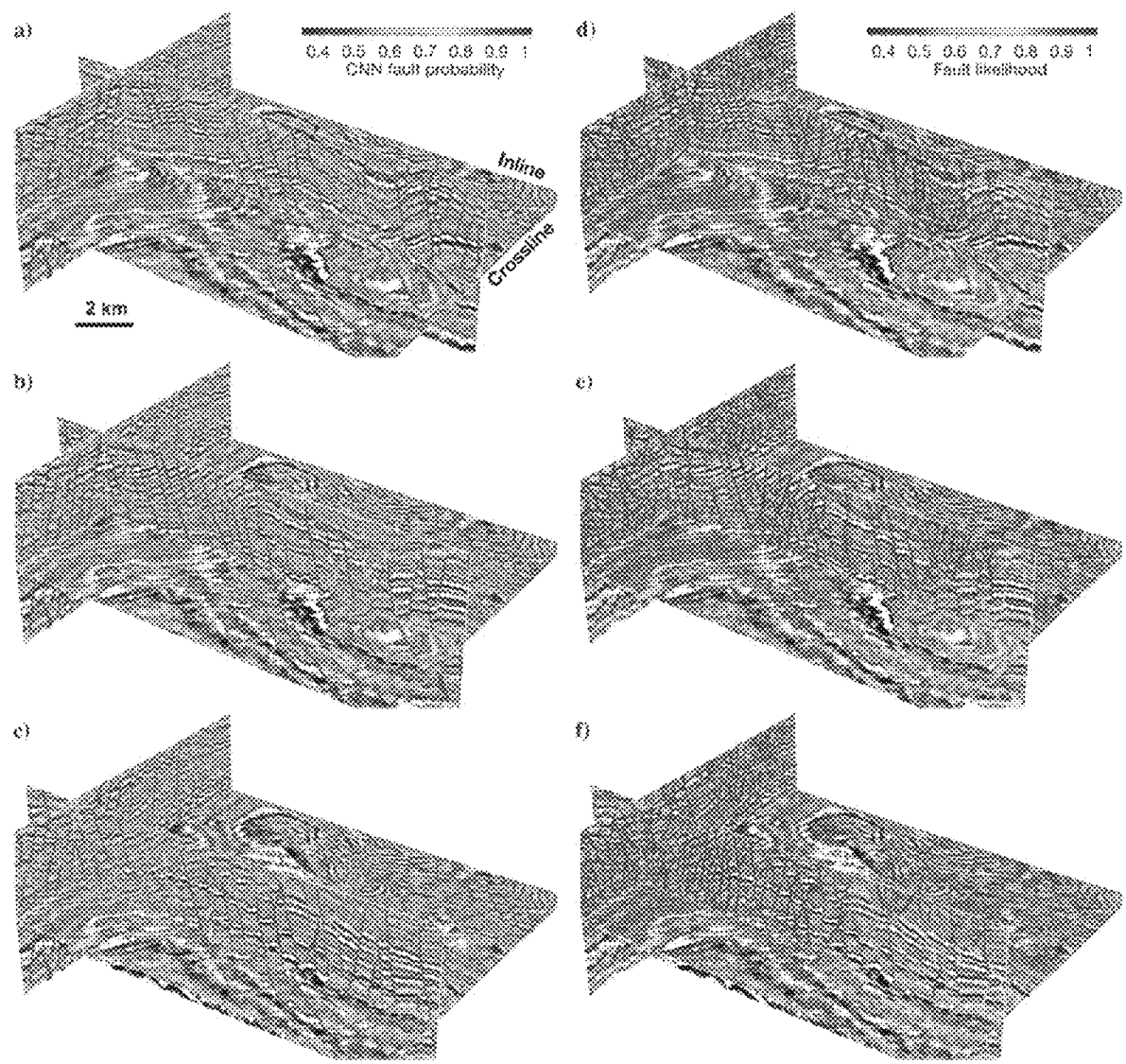
FIG. 9 shows images of faults detected in a complicated 3D example by using a trained model configured in accordance with embodiments of the present disclosure (images (a)-(c)), and a thinned fault likelihood method (images (d)-(f)).

The third 3D seismic image shown in FIG. 9 is a subset (210 [vertical]×600 [inline]×825 [crossline] samples) extracted from a larger seismic reflection volume that is acquired across the Costa Rica margin, northwest of the Osa Peninsula to image the fault properties in the subduction zone. Multiple sets of closely spaced faults are apparent in this 3D seismic volume as discussed by Bangs et al. (2015). The fault detection in this example is more challenging than the previous ones because the faults are very close to each other, the reflection structures are not well-imaged, and the image is fairly noisy. The images (a)-(c) of FIG. 9 show the fault probabilities predicted by the CNN model of the present disclosure at different slices. Applicants observed that most faults are clearly labeled in this CNN fault probability images, and these faults can be continuously tracked by following the probability features. Multiple sets of faults striking in different directions can be clearly observed on the horizontal slice in these CNN fault probability images. Images (d)-(f) of FIG. 9 show the thinned fault likelihoods at the same slices, which can detect most faults, but the fault features are much noisier than the CNN fault probabilities. In addition, many of the faults are mislabeled, especially in areas where the seismic structures are noisy.

Figure 10:
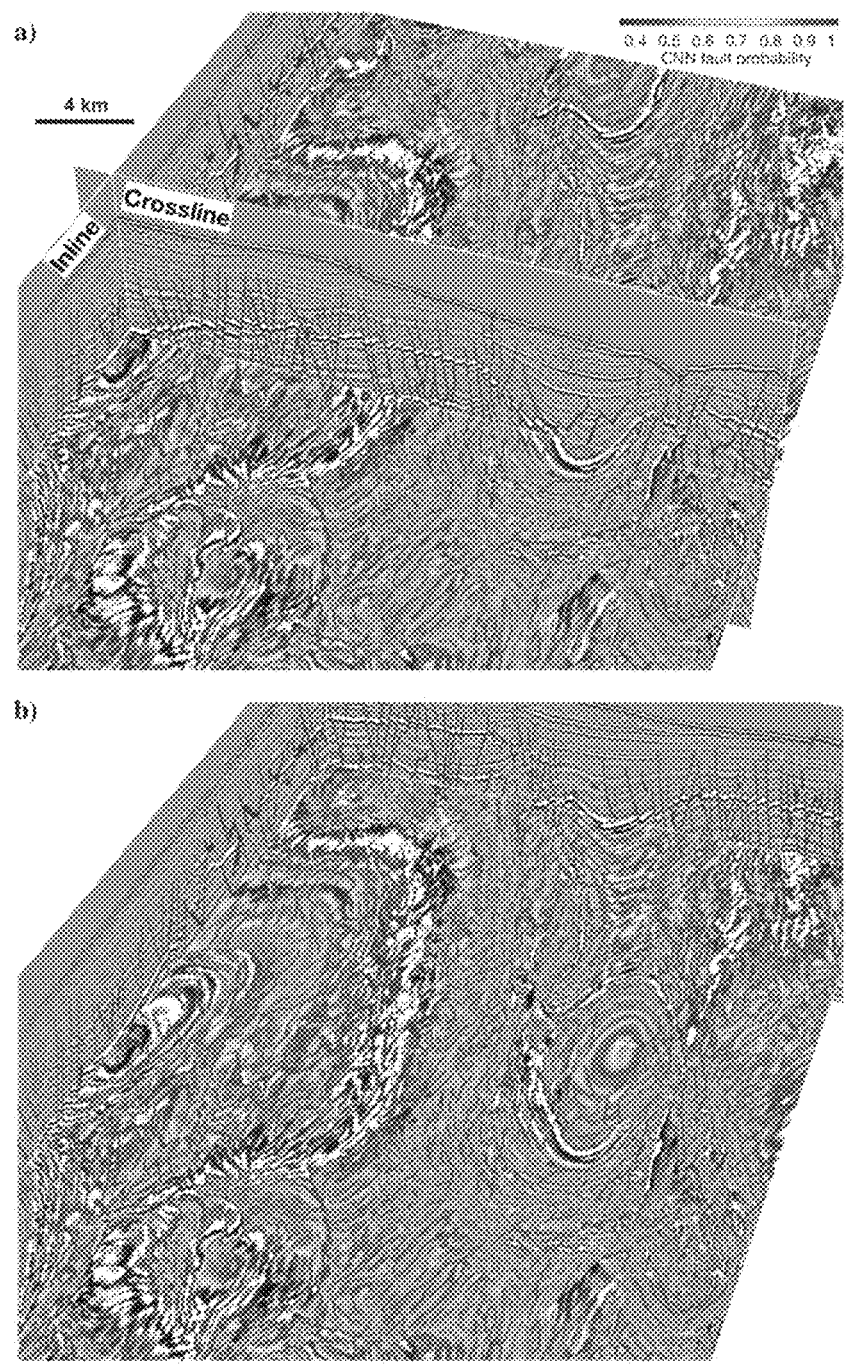
FIG. 10 shows 3D seismic image overlaid with fault probabilities, established in accordance with embodiments of the present disclosure, at different slices (images (a) and (b)), where most of the faults are clearly and accurately labeled.
Figure 11:
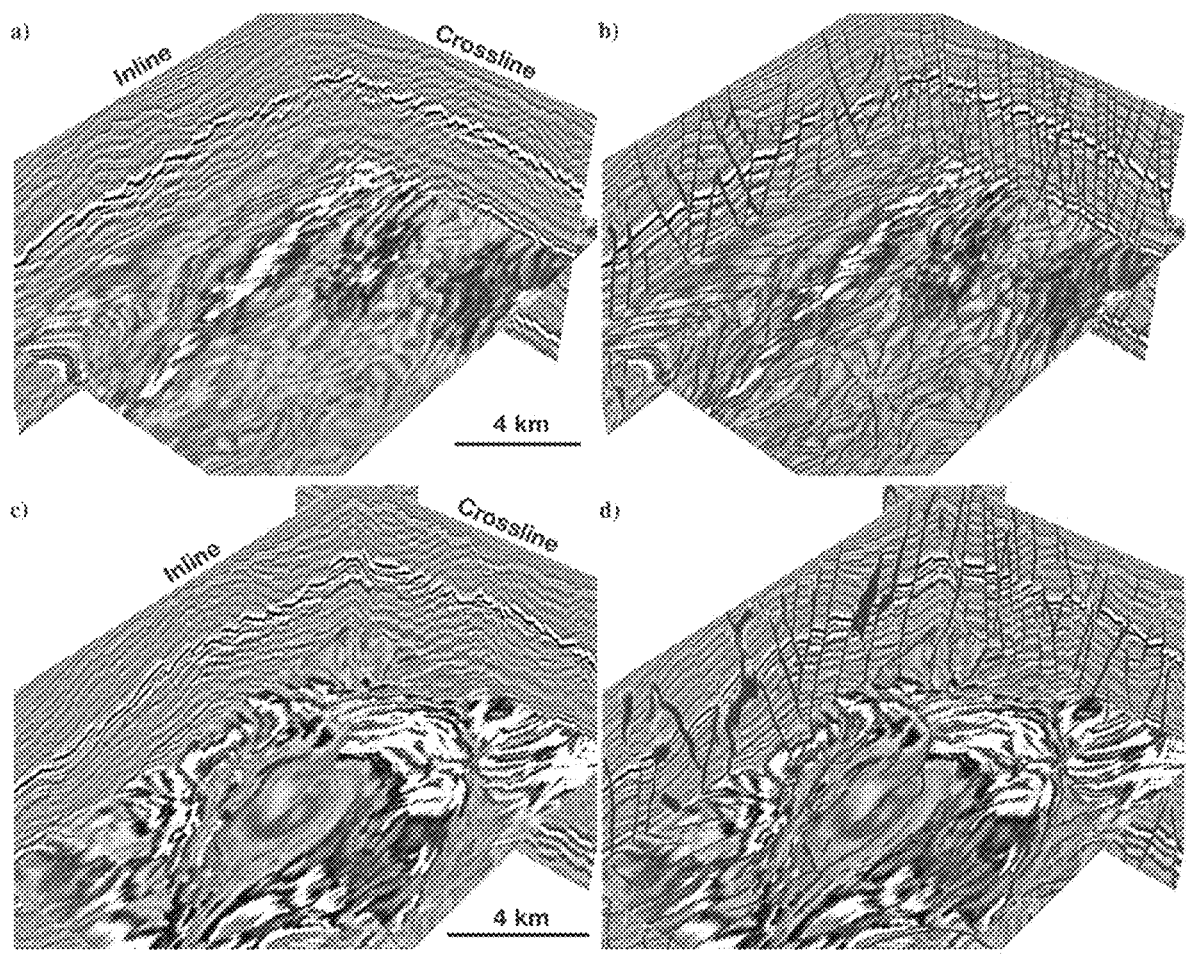
FIG. 11 shows images of two subvolumes (images (a) and (c)) of the seismic amplitude and fault probabilities (images (b) and (d)) extracted from the full volumes of FIG. 10 in accordance with embodiments of the present disclosure.

FIG. 10 shows the fourth larger seismic volume (450 [vertical]×1950 [inline]×1200 [crossline] samples) that was acquired at the Campos Basin, offshore Brazil. This image shows that the sediments are heavily faulted due to the salt bodies at the bottom of the volume. The CNN fault probabilities produced by embodiments of the present disclosure shown in images (a) and (b) of FIG. 10 clearly and accurately label numerous closely spaced faults in this seismic volume. The faulting patterns are clearly visible on the time slices of the CNN fault probability image. To be able to better visualize the fault detection in this example, two subvolumes of seismic amplitude and CNN fault probabilities are shown in images (b) and (d) of FIG. 11, in which most of the faults are clearly and accurately labeled except some subtle faults. The horizontal slices in images (b) and (d) of FIG. 11, respectively, display clear patterns of polygonal and radial faults that may be associated with salt diapirs (Rowan et al., 1999; Carruthers, 2012).

In addition to the above field examples, applicants also applied the same trained CNN model of the present disclosure to two other 3D seismic images, Kerry-3D and Opunake-3D, which are provided on the SEG Wiki website. The fault segmentation results are clean and accurate as shown in the SEG Wiki website (Wu, 2018a, 2018b, 2019).

In summary, although the CNN model of the present disclosure may be trained by using only about 200 synthetic seismic images, it works well to detect faults in 3D field seismic volumes that are recorded at totally different surveys. In addition, the 3D fault prediction using the trained CNN model is highly efficient. By using one TITAN Xp GPU, computing the large CNN fault probability volume (450 [vertical]×1950 [inline]×1200 [crossline] samples) in FIG. 10 took less than 3 minutes. Computing fault likelihoods for the same volume, however, required approximately 1.5 hours when using a workstation with 32 cores.

In training and validating data sets, embodiments of the present disclosure may avoid including thrust and listric faults with low dip angles. These faults often appear as strong reflection features in a seismic image other than reflection discontinuities as the faults discussed in this disclosure. Therefore, all the conventional fault detection methods, based on measuring reflection discontinuity or continuity, often fail to detect the thrust and listric faults. However, the CNN-based technique of the present disclosure has potential to successfully detect these faults by training another specific model.

As previously noted, embodiments of the present disclosure may be implemented with any suitable machine learning system. Such a machine learning system may implement any well-known machine learning system, including one that implements a neural network (e.g., artificial neural network, deep neural network, convolutional neural network (e.g., U-Net), recurrent neural network, autoencoders, reinforcement learning, etc.), fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

Machine learning often occurs in two stages. For example, first, training may be performed offline in which training data sets are created as described herein. During this training stage, one or more machine learning algorithms generate synthetic data sets as described herein. Non-limiting examples of training algorithms including, but are not limited to, linear regression, gradient descent, feed forward, polynomial regression, learning curves, regularized learning models, and logistic regression. It is during this training stage that the machine learning algorithms create a knowledge base for later processing of seismic data. Such a knowledge base may include one or more libraries, wherein each library includes parameters for utilization by the machine learning system in fault detection. In accordance with certain embodiments of the present disclosure, such libraries may be adjusted by a user for how well certain faults are detected.

Secondly, after the algorithms have been established and the machine learning system has sufficiently been trained in fault detection, the libraries are then implemented for fault detection with actual seismic data.

As has been described herein, embodiments of the present disclosure may be implemented to perform the various functions described for fault detection. Such functionalities may be implemented within hardware and/or software, such as within one or more data processing systems (e.g., the data processing system 3400 of FIG. 13). Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 13), a read-only memory ("ROM") (e.g., ROM 3435 of FIG. 13), an erasable programmable read-only memory ("EPROM" or flash memory), an optical fiber, a portable compact disc read-only memory ("CD-ROM"), an optical storage device, a magnetic storage device (e.g., hard drive 3431 of FIG. 13), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function (s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved. Additionally, certain functionalities may be optional (e.g., any one or more of the process blocks 1202, 1203, 1204, 1206).

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401, CPU 3415)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, or any of the machine learning software disclosed herein. The program code may execute entirely on the user's computer system, partly on the user's computer system, as a stand-alone software package, partly on the user's computer system and partly on a remote computer system (e.g., the computer system utilized to train the machine learning system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider).

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing. Such configured devices are physically designed to perform the specified function.

In the descriptions herein, numerous specific details are provided, such as examples of synthetic seismic data, programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Figure 13:
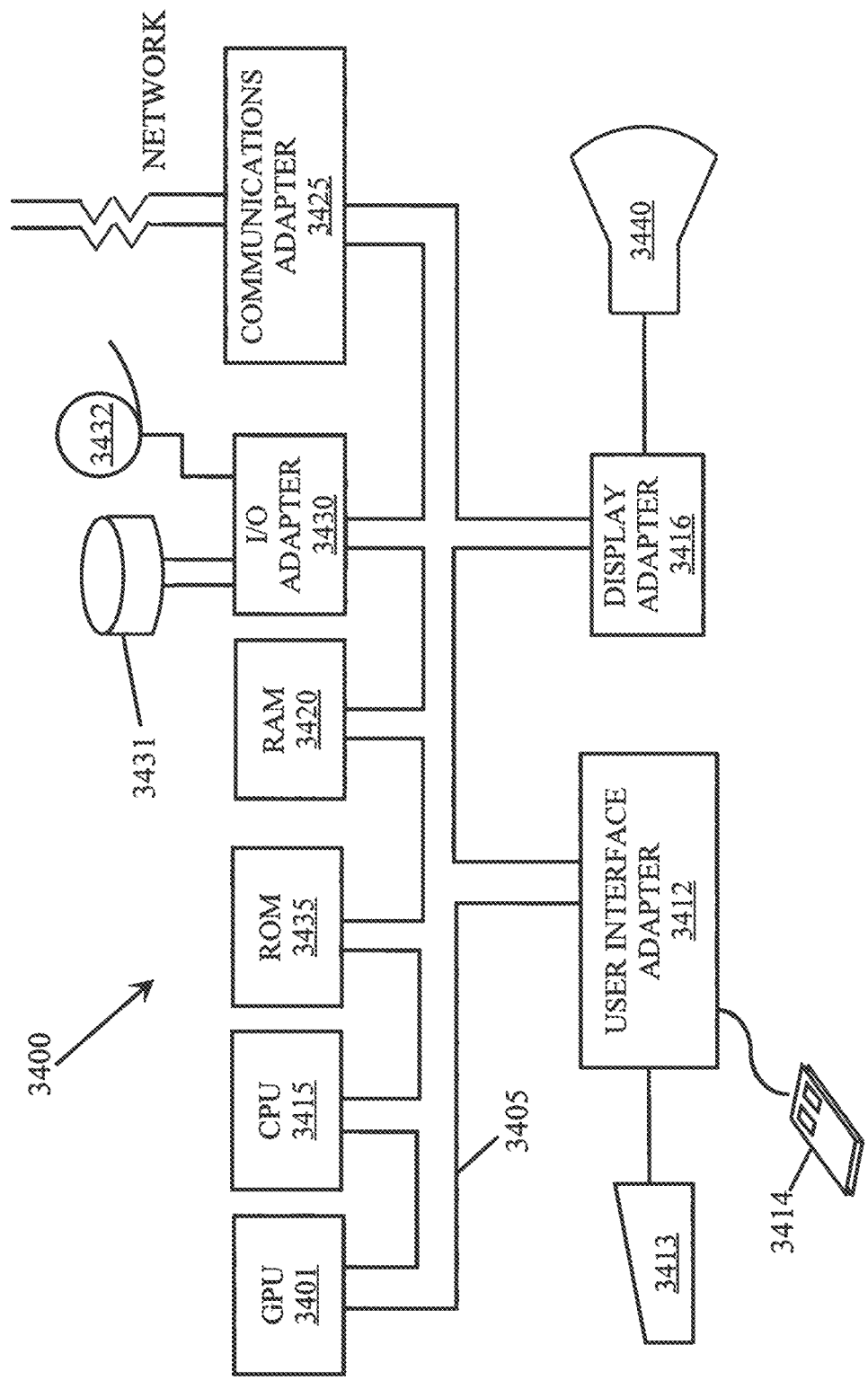
FIG. 13 illustrates a block diagram of a data processing system configured in accordance with embodiments of the present disclosure.

With reference now to FIG. 13, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. In certain embodiments of the present disclosure, one or more GPUs 3401 (e.g., a GPGPU, or general purpose computing on graphics processing unit) may be implemented within the computer system 3400 to operate any one or more of the machine learning systems disclosed herein. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. In FIG. 13, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 13 may vary depending on the implementation. Other internal hardware or peripheral devices, such as flash ROM (or equivalent nonvolatile memory) or optical disk drives and the like, may be used in addition to or in place of the hardware depicted in FIG. 13. Also, any of the processes of the present disclosure may be applied to a multiprocessor computer system, or performed by a plurality of such systems 3400. For example, training may be performed by a first computer system 3400, while fault detection may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 13 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context. As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5, " which should be interpreted to include all of the above-recited values and ranges. Further, such an interpretation should apply regardless of the breadth of the range or the characteristic being described.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers (e.g., expressing certain numbers of pairs of synthetic seismic and fault images), and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

REFERENCES

Unless otherwise noted, each of the below are fully incorporated by reference and made a part hereof:

A. A. Aqrawi et al., "Improved fault segmentation using a dip guided and modified 3D Sobel filter," SEG San Antonio 2011 Annual Meeting, Expanded Abstracts, pp. 999-1003, Sep. 18-23, 2011.

V. Badrinarayanan et al., "SegNet: A Deep Convolutional Encoder-Decoder Architecture for Image Segmentation," IEEE Transactions on Pattern Analysis and Machine Intelligence, vol. 39, no. 12, pp. 2481-2495, Jan. 1, 2017.

P. Bakker, "Image structure analysis for seismic interpretation," Ph.D. Thesis, Delft University of Technology, 128 pages, 2002.

N. L. Bangs et al., "Fluid accumulation along the Costa Rica subduction thrust and development of the seismogenic zone, " J. Geophys. Res. Solid Earth, 120, pp. 67-86, Jan. 29, 2015.

T. D. Carruthers, "Interaction of Polygonal Fault Systems with Salt Diapirs," Ph.D. Thesis, Cardiff University, 525 pages, July 2012.

F. Chollet, 2015, Keras, https://github.com/fchollet/keras, accessed September 2018.

I. Cohen et al., "Detection and extraction of fault surfaces in 3D seismic data," Geophysics, vol. 71, no. 4, pp. P21-P27, Jul. 12, 2006.

H. Di et al., "Patch-level MLP classification for improved fault detection," SEG International Exposition and 88th Annual Meeting, Expanded Abstracts, pp. 2211-2215, Oct. 14-19, 2018.

A. Gersztenkorn et al., "Eigenstructure-based coherence computations as an aid to 3-D structural and stratigraphic mapping," Geophysics, vol. 64, no. 5, pp. 1468-1479, September-October 1999.

R. Girshick et al., "Rich feature hierarchies for accurate object detection and semantic segmentation," Proceedings of the 2014 IEEE Conference on Computer Vision and Pattern Recognition, pp. 580-587, Jun. 23-28, 2014.

A. Guitton, "3D convolutional neural networks for fault interpretation," 80th EAGE Conference & Exhibition 2018, Extended Abstracts, 5 pages, Jun. 11-14, 2018.

B. Guo et al., "A new method for automatic seismic fault detection using convolutional neural network," SEG International Exposition and 88th Annual Meeting, Expanded Abstracts, pp. 1951-1955, Oct. 14-19, 2018.

D. Hale, "Structure-oriented smoothing and semblance," CWP Report 635, Colorado School of Mines, 261-270, 2009.

D. Hale, "Methods to compute fault images, extract fault surfaces, and estimate fault throws from 3D seismic images," Geophysics, vol. 78, no. 2, pp. 033-043, Feb. 25, 2013.

K. He et al., "Mask R-CNN," Proceedings of the IEEE International Conference on Computer Vision, pp. 2961-2969, Mar. 20, 2017.

L. Huang et al., "A scalable deep learning platform for identifying geologic features from seismic attributes," The Leading Edge, vol. 36, issue 3, pp. 249-256, March 2017.

D. P. Kingma et al., "Adam: A method for stochastic optimization," Published as a conference paper at the 3rd International Conference for Learning Representations, pp. 1-15, Dec. 22, 2014.

F. Li et al., "Coherence attribute at different spectral scales," Interpretation, vol. 2, no. 1, pp. 1-8, February 2014.

C. Mansfield et al., "High resolution fault displacement mapping from three-dimensional seismic data: Evidence for dip linkage during fault growth," Journal of Structural Geology, vol. 18, nos. 2/3, pp. 249-263, February-March 1996.

K. J. Marfurt et al., "3-D seismic attributes using a semblance-based coherency algorithm," Geophysics, vol. 63, no. 4, pp. 1150-1165, July-August 1998.

K. J. Marfurt et al., "Coherency calculations in the presence of structural dip," Geophysics, vol. 64, no. 1, pp. 104-111, January-February 1999.

D. R. Martin et al., "Learning to detect natural image boundaries using local brightness, color, and texture cues," IEEE Transactions on Pattern Analysis and Machine Intelligence, vol. 26, no. 5, pp. 530-549, May 2004.

H. Muraoka et al., "Displacement distribution along minor fault traces," Journal of Structural Geology, vol. 5, no. 5, pp. 483-495, April 1983.

Neff et al., "Automated seismic fault detection and picking," U.S. Pat. No. 6,018,498.

S. I. Pedersen et al., "Automatic fault extraction using artificial ants," 72nd Annual International Meeting, SEG Technical Program, Expanded Abstracts, 4 pages, January 2002.

S. I. Pedersen et al., "New paradigm of fault interpretation," 73rd Annual International Meeting, SEG Technical Program, Expanded Abstracts, 4 pages, January 2003.

F. J. Provost et al., "The case against accuracy estimation for comparing induction algorithms," Proceedings of the 15th International Conference on Machine Learning, 9 pages, 1998.

T. Randen et al., "Automatic extraction of fault surfaces from three-dimensional seismic data," 81st Annual International Meeting, SEG Technical Program, Expanded Abstracts, 5 pages, January 1999.

S. Ren et al., "Faster R-CNN: Towards Real-Time Object Detection with Region Proposal Networks," Advances in Neural Information Processing Systems, 9 pages, 2015.

O. Ronneberger et al., "U-Net: Convolutional networks for biomedical image segmentation," International Conference on Medical Image Computing and Computer-Assisted Intervention, 234-241, 2015.

M. G. Rowan et al., "Salt-related fault families and fault welds in the Northern Gulf of Mexico," AAPG Bulletin, vol. 83, no. 9, 1454-1484, 1999.

S. A. Stewart, "Displacement distributions on extensional faults: Implications for fault stretch, linkage, and seal," AAPG Bulletin, vol. 85, no. 4, pp. 587-599, April 2001.

Van Bemmel et al., "Seismic signal processing method and apparatus for generating a cube of variance values," U.S. Pat. No. 6,151,555.

X. Wu, 2017, Directional structure-tensor based coherence to detect seismic faults and channels, "Geophysics, 82, no. 2, A13-A17, doi," 10.1190/geo2016-0473.1.

X. Wu, 2018a, Kerry-3D, https://wiki.seg.org/wiki/Kerry-3D, accessed March 2019.

X. Wu, 2018b, Opunake-3D, https://wiki.seg.org/wiki/Opunake-3D, accessed March 2019

X. Wu, 2019, GitHub repository, https://github.com/xinwucwp/faultSeg, accessed March 2019

X. Wu and S. Fomel, 2018, Automatic fault interpretation with optimal surface voting," Geophysics, 83, no. 5, 067-082, doi: 10.1190/geo2018-0115.1.

X. Wu and D. Hale, "3D seismic image processing for faults," Geophysics, vol. 81, no. 2, pp. IM1-IM11, March-April 2016.

X. Wu, Y. Shi, S. Fomel, and L. Liang, 2018, "Convolutional neural networks for fault interpretation in seismic images," SEG International Exposition and 88th Annual Meeting, Expanded Abstracts, 1946-1950, Oct. 14-19, 2018.

X. Wu and Z. Zhu, 2017, "Methods to enhance seismic faults and construct fault surfaces," Computers and Geosciences, 107, 37-48, doi: 10.1016/j.cageo.2017.06.015.

S. Xie and Z. Tu, 2015, "Holistically-nested edge detection," Proceedings of the IEEE International Conference on Computer Vision, pp. 1395-1403.

T. Zhao et al., "A fault-detection workflow using deep learning and image processing," SEG International Exposition and 88th Annual Meeting, Expanded Abstracts, pp. 1966-1970, Oct. 14-19, 2018.

What is claimed is:

1. A method of seismic fault detection using three-dimensional (3D) binary seismic fault segmentation of images comprising:
  providing a machine learning system that comprises a data processing system executing a machine learning algorithm for 3D seismic fault segmentation of images;
  generating a synthetic data set comprised of a plurality of 3D synthetic seismic images and corresponding binary fault labeling images;
  training the machine learning algorithm of the machine learning system using at least a portion of the synthetic data set, wherein the machine learning algorithm is trained using a class-balanced binary cross-entropy loss function to adjust any imbalance so that the machine learning system is not trained or converged to predict only zeros;
  obtaining one or more actual 3D seismic images from a seismic volume; and
  predicting a fault in the seismic volume using the trained machine learning algorithm and the one or more actual 3D seismic images.

2. The method of claim 1, wherein training the machine learning algorithm occurs in two hours or less.

3. The method of claim 1, wherein predicting faults in the seismic volume using the trained machine learning algorithm occurs in less than 5 minutes when the seismic volume is a large seismic volume with 450×1950×1200 samples, or occurs in less than one second when the seismic volume is a seismic volume with 128×128×128 samples.

4. The method of claim 1, wherein the machine learning algorithm comprises a convolutional neural network.

5. The method of claim 4, wherein the convolutional neural network comprises a simplified U-Net convolutional neural network with a reduced the number of convolutional layers and features at each layer.

6. The method of claim 5, wherein the machine learning algorithm is trained using a class-balanced binary cross-entropy loss function to adjust any imbalance so that the machine learning algorithm is not trained or converged to predict only zeros.

7. The method of claim 1, wherein generating the synthetic data set comprised of a plurality of 3D synthetic seismic images and corresponding binary fault labeling images comprises defining, by a set of parameters, seismic folding and faulting structures, wavelet peak frequencies, and noise, wherein each parameter is chosen from a pre-defined range.

8. The method of claim 7, wherein a combination of the parameters are randomly chosen within the predefined ranges to generate numerous unique seismic images and corresponding fault labeling images.

9. The method of claim 1, wherein the machine learning algorithm is trained using 200 pairs of 3D synthetic seismic images and corresponding binary fault labeling images.

10. The method of claim 1, further comprising validating the trained machine learning algorithm.

11. The method of claim 10, wherein the trained machine learning algorithm is trained using 20 pairs of 3D synthetic seismic images and corresponding binary fault labeling images.

12. The method of claim 1, wherein generating the synthetic data set comprised of the plurality of 3D synthetic seismic images and corresponding binary fault labeling images comprises, for each 3D synthetic seismic image:
  providing a 1-dimensional (1D) horizontal reflectivity model r(x,y,z) with a sequence of random numbers/values that are in a range of [−1, 1];
  creating and adding folding structures in the reflectivity model by vertically shearing the reflectivity model, wherein shearing shifts are defined by a combination of several 2-dimensional (2D) Gaussian functions;
  adding planar shearing to the reflectivity model to increase complexity of the folding structures to obtain a folded reflectivity model;
  adding planar faulting to the model to obtain a folded and faulted reflectivity model, wherein displacements of the planar faults are all different from each other; and
  convolving the folded and faulted reflectivity model with a wavelet to obtain a synthetic 3D seismic image.

13. The method of claim 12, wherein the folding structures are defined by the function:

$$s_1(x, y, z) = a_0 + \frac{1.5z}{z_{max}} \sum_{k=1}^{k=N} b_k e^{\frac{(x-c_k)^2+(y-d_k)^2}{2\sigma_k^2}},$$

which combines with multiple 2D Gaussian functions and a linear-scale function $1.5z/z_{max}$, wherein parameters $a_0$, $b_k$, $c_k$, $d_k$, and $\sigma_k$ yields specific spatially varying folding structures in the model.

14. The method of claim 12, wherein the planar shearing is defined by:

$$s_2(x,y,z)=e_0+fx+gy,$$

where the shearing shifts are laterally planar while being vertically invariant, the parameters $e_0$, f, and g are randomly chosen from predefined ranges, wherein by sequentially applying the planar shifts s2(x,y,z) to the previously folded model r(x,y,z+$s_1$(x,y,z)), a new reflectivity model r(x,y,z+$s_1$+$s_2$) is obtained.

15. The method of claim 12, wherein planar fault displacement distributions are a Gaussian function or a linear function, wherein In the case of Gaussian distribution, the fault displacements decrease from the fault center in all directions along a fault plane, and in the case of linear distribution, the fault displacements linearly increase (normal fault) or decrease (reverse fault) in a fault dip direction along the fault plane.

16. The method of claim 15, wherein a maximum fault displacement for each fault may be randomly chosen in a range between about 0 and 40, and wherein five or more faults are included in a training image with the size of 128×128×128.

17. The method of claim 12, wherein the folded and faulted reflectivity model is convolved with a Ricker wavelet, wherein a peak frequency of the wavelet is randomly chosen from a predefined range.

18. The method of claim 12, wherein the folded and faulted reflectivity model is convolved with the wavelet after creating folding and faulting in the model to blur any sharp discontinuities near faults, therefore making the faults look more realistic.

19. The method of claim 12, further comprising adding random noise to the synthetic 3D seismic image.

20. The method of claim 12, further comprising creating the corresponding binary fault labeling image from the synthetic 3D seismic image, wherein faults are labeled by ones at two pixels adjacent to the faults from a hanging wall side and a footwall side and zeros are used to label non-fault sections of the image.

* * * * *